US010974262B2

(12) United States Patent
Farra et al.

(10) Patent No.: US 10,974,262 B2
(45) Date of Patent: Apr. 13, 2021

(54) INTUITIVE WIDTH CONTROL SPRINKLER

(71) Applicant: Fiskars Oy Ab, Helsinki (FI)

(72) Inventors: Steven Howard Farra, Madison, WI (US); Nicholas Vallo, Madison, WI (US); Kalyan K. Vedantam, Madison, WI (US)

(73) Assignee: Fiskars Finland Oy Ab, Helsinki (FI)

( * ) Notice: Subject to any disclaimer, the term of this patent is extended or adjusted under 35 U.S.C. 154(b) by 149 days.

(21) Appl. No.: 15/837,359

(22) Filed: Dec. 11, 2017

(65) Prior Publication Data

US 2018/0178238 A1    Jun. 28, 2018

Related U.S. Application Data

(60) Provisional application No. 62/438,562, filed on Dec. 23, 2016.

(51) Int. Cl.
*B05B 3/00* (2006.01)
*B05B 3/04* (2006.01)
(Continued)

(52) U.S. Cl.
CPC ............ *B05B 3/044* (2013.01); *B05B 15/652* (2018.02); *A01G 25/02* (2013.01); *B05B 3/021* (2013.01)

(58) Field of Classification Search
CPC ....... B05B 3/044; B05B 15/652; B05B 3/021; A01G 25/02
(Continued)

(56) References Cited

U.S. PATENT DOCUMENTS 6,029,907 A * 2/2000 McKenzie ............ B05B 15/652
                                              239/240
6,085,995 A * 7/2000 Kah, Jr. ................ B05B 1/1645
                                              239/237

(Continued)

FOREIGN PATENT DOCUMENTS

| CN | 204842037 | 12/2015 |
|---|---|---|
| DE | 20 2008 008 873 | 3/2009 |
| DE | 10 2011 000 344 | 10/2011 |

OTHER PUBLICATIONS

International Search Report and Written Opinion for International Application No. PCT/US2017/065583, dated May 7, 2018, 16 pages.
(Continued)

*Primary Examiner* — Qingzhang Zhou
*Assistant Examiner* — Joel Zhou
(74) *Attorney, Agent, or Firm* — Foley & Lardner LLP

(57) ABSTRACT

An irrigation device includes a body defining a fluid passage; a slider movably coupled to the body, wherein the slider includes a body defining a plurality of apertures and a plurality of projections extending away from the body; a plurality of flexible jets coupled longitudinally to the body, wherein the plurality of flexible jets receive fluid from the fluid passage, and wherein each jet is received by an aperture in the plurality of apertures of the slider; and a toggle rotatably coupled to the body and to the slider, wherein the toggle is rotatably coupled to the body in substantial alignment with the plurality of jets, and wherein rotation of the toggle in a first direction moves the slider to cause at least one projection of the slider to engage with at least one jet to adjust a position of the at least one jet.

20 Claims, 5 Drawing Sheets

(51) Int. Cl.
  *B05B 15/652*  (2018.01)
  *A01G 25/02*   (2006.01)
  *B05B 3/02*    (2006.01)

(58) Field of Classification Search
  USPC .................................................. 239/246, 562
  See application file for complete search history.

(56) References Cited

U.S. PATENT DOCUMENTS

| | | | | |
|---|---|---|---|---|
| 6,135,356 | A  * | 10/2000 | Mitzlaff ................. | B05B 3/044 |
| | | | | 239/1 |
| 6,601,781 | B2 * | 8/2003  | Kah, III ................ | B05B 1/1645 |
| | | | | 239/391 |
| 8,534,573 | B2 * | 9/2013  | Wang .................... | B05B 15/652 |
| | | | | 239/242 |
| 8,567,692 | B2 * | 10/2013 | Coppersmith ........ | B05B 3/0454 |
| | | | | 239/11 |
| 2011/0095101 | A1 | 4/2011 | Wang et al. | |
| 2011/0248102 | A1 | 10/2011 | Wang | |

OTHER PUBLICATIONS

Office Action received for Canadian Application No. 3047965, dated Nov. 10, 2020, 5 pages.

* cited by examiner

INTUITIVE WIDTH CONTROL SPRINKLER

CROSS-REFERENCE TO RELATED APPLICATION

This application claims the benefit of U.S. Provisional Patent Application No. 62/438,562, filed Dec. 23, 2016, entitled "INTUITIVE WIDTH CONTROL SPRINKLER," which is incorporated herein by reference in its entirety.

FIELD

The present disclosure relates to irrigation devices. More particularly, the present disclosure relates to a width control mechanism for a sprinkler.

BACKGROUND

This section is intended to provide a background or context to the disclosure recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Irrigation devices, such as sprinklers, are used to provide fluid such as water to desired areas typically without user control. Beneficially, this enables owners/users of the irrigation devices to tend to other tasks while fluid is being provided to a desired area (e.g., a region of a lawn, a flower bed, etc.). There are many types of irrigation devices including, but not limited to: a pop-up sprinkler that is stored at or below a ground surface that selectively "pops-up" when in use to provide fluid; impact or impulse sprinklers that utilize fluid flow to drive rotation of the spray nozzle of the sprinkler; fixed spray sprinklers that provide a fixed stream of fluid (e.g., no rotation or other movement); oscillating sprinklers that provide a stream of fluid and oscillate about an axis of rotation; and various other types of irrigation devices.

Oscillating sprinklers are a popular choice for residential (e.g., home lawns) and commercial (e.g., golf courses) uses. In operation, the oscillating sprinkler is inserted or rested upon a ground surface, coupled to a fluid source, and activated to provide a stream of fluid in an oscillating manner about an axis of rotation. The oscillating sprinkler typically includes a plurality of jets or nozzles arranged axially or substantially axially along a body of the oscillating sprinkler. As such, as the body rotates about the axis, the jets also rotate about the axis. To control the size of the coverage area (i.e., the area wetted by the fluid emitted from the jets), a "width" control knob is typically included with the oscillating sprinkler. The width control knob enables a user to adjust an angle of emission of the fluid from the plurality of jets: a large angle corresponds with a greater coverage area than a small angle. While such a knob is beneficial in tailoring the emitted fluid to the intended area, the placement of the width control knob is typically in an inconvenient/cumbersome location for the user especially when the sprinkler is in use.

SUMMARY

One embodiment relates to an irrigation device. The irrigation device includes a body defining a fluid passage; a slider movably coupled to the body, wherein the slider includes a body defining a plurality of apertures and a plurality of projections extending away from the body; a plurality of flexible jets coupled longitudinally to the body, wherein the plurality of flexible jets receive fluid from the fluid passage, and wherein each jet is received by an aperture in the plurality of apertures of the slider; and a toggle rotatably coupled to the body and to the slider, wherein the toggle is rotatably coupled to the body in substantial alignment with the plurality of jets, and wherein rotation of the toggle in a first direction moves the slider to cause at least one projection of the slider to engage with at least one jet to adjust a position of the at least one jet.

Another embodiment relates to a sprinkler. The sprinkler includes a body defining a fluid passage; a frame coupled to the body, the frame disposed in an internal volume of the body proximate the fluid passage, wherein the frame defines a plurality of apertures; a first toggle movably coupled to the body; a first slider disposed within the internal volume of the body and coupled to the first toggle, the first slider defining a plurality of apertures; and, a first plurality of jets coupled to the frame, wherein each jet in the first plurality of jets is received by an aperture of each of the first slider and the frame, and wherein fluid from the fluid passage is selectively provided to the first plurality of jets. The first toggle is movable between a first position and a second position, wherein movement of the first toggle to the second position moves the first slider in a same direction as the first toggle, wherein the movement of the first slider in the same direction causes the first slider to move at least one jet in the first plurality of jets in the same direction such that the at least one jet moves in the same direction as the first toggle.

Still another embodiment relates to a sprinkler. The sprinkler includes a body defining a fluid passage; a slider movably coupled to the body, wherein the slider includes a body defining a plurality of apertures and a projection extending away from the body; and a plurality of flexible jets coupled to the body, wherein the plurality of jets receive fluid from the fluid passage, and wherein each jet in the plurality of jets is received by an aperture in the plurality of apertures of the slider. The slider is movable within the body between a first position and a second position, wherein movement of the slider to the second position causes the projection to move the at least one jet in a same direction as the movement of the slider from the first position to the second position.

DETAILED DESCRIPTION

Figure 1:
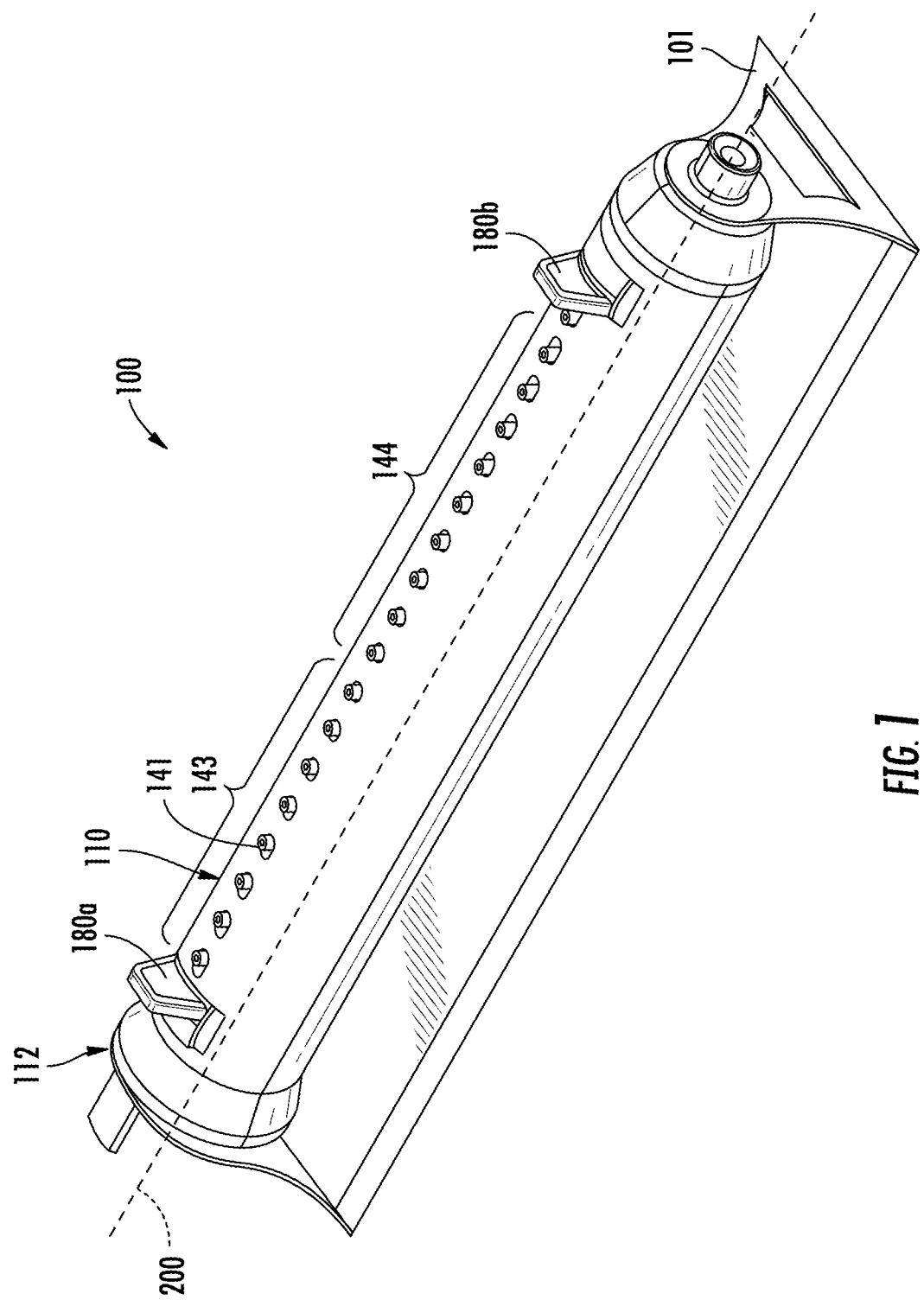
FIG. 1 is a perspective view of an irrigation device, shown as an oscillating sprinkler, according to an exemplary embodiment.

Referring to the Figures generally, an irrigation device with an intuitive width control mechanism is shown herein. According to the present disclosure, the irrigation device is configured as an oscillating sprinkler that includes the intuitive width control mechanism. The oscillating sprinkler includes a body, a first plurality of jets, a second plurality of jets, a first slider cooperating with the first plurality of jets, a second slider cooperating with the second plurality of jets, a first toggle coupled to the first slider, and among other components a second toggle coupled to the second slider. The body is rotatable about a longitudinal axis to provide the oscillation feature of the oscillating sprinkler. The first and second pluralities of jets are resiliently flexibly and configured to emit a fluid (e.g., water) when the sprinkler is in use. The first and second toggles are coupled to the body and, according to the present disclosure, are rotatable about an axis that is perpendicular or substantially perpendicular to the axis of rotation of the body. In this regard, the first and second toggles are positioned along or substantially along the axis of rotation of the body. In operation, rotation of the first and second toggles moves the first and second sliders, respectively. Movement of the first and second sliders impacts at least one of the jets in the first and second pluralities of jets, respectively, to push the at least one of the jets in the first and second pluralities of jets. Due to the resilient bending characteristic of the jets, the at least one jet in the first and second pluralities of jets is angularly bent. The angular movement of the at least one jet in the first and second pluralities of jets, respectively, adjusts a width of dispersal of the emitted fluid (hence, a "width" control mechanism) from the sprinkler. As a result, the width control mechanism may enable a user to control the coverage area of the emitted fluid from the oscillating sprinkler to correspond with or substantially correspond with a desired coverage area (i.e., an area desired to be wetted).

Beneficially, the first toggle cooperates with the first plurality of jets while the second toggle cooperates with the second plurality of jets such that each plurality of jets is independently adjustable. Thus, a user may rotate the first toggle to provide a wide or large jet angle for the first plurality of jets while adjusting the second toggle provide a narrow or small jet angle for the second plurality of jets. Advantageously, such tailoring may enable the user to better control the coverage area as compared to conventional oscillating sprinklers. Further and according to one configuration, the angle of rotation of the toggle substantially corresponds with the angle of at least one of the jets. As such, a user can observe the anticipated fluid dispersal angle without having to turn the fluid on/off to gain an indication. Therefore, a time-savings and convenience benefit may be realized. These and other features and benefits are described more fully herein below.

It should be understood that while the present disclosure describes the sprinkler as emitting a "fluid," this is done on purpose as the present disclosure contemplates that the type of fluid may be highly configurable. For example and in one embodiment, the type of fluid may be water, which may be provided by a spigot or other water source. In another example, a reservoir containing a mixture of water and fertilizer may be used by the sprinkler. In still another example, a variety of other types of fluids may be used. Thus, those of ordinary skill in the art will appreciate and recognize that the irrigation device of the present disclosure may provide water in addition to various other types of fluids with all such variations intended to fall within the scope of the present disclosure.

Referring now to FIG. 1, an irrigation device, shown as an oscillating sprinkler 100, is depicted according to an example embodiment. The oscillating sprinkler 100 is configured to emit fluid to wet or substantially wet a desired area. As shown, the oscillating sprinkler 100 includes a base 101 coupled to a body 110, an end cap 111, a fluid inlet 112, a pair of toggles shown as a first toggle 180a and a second toggle 180b, a plurality of jets 141 coupled to the body 110 and split into a first plurality of jets 143 and a second plurality of jets 144, and various other components described herein below. In operation, the body 110 (or at least the portion thereof that includes the pluralities of jets) rotates about an axis 200 (hence, an "oscillating" sprinkler). As shown, the plurality of jets 141 is substantially aligned with the axis 200. The axis 200 corresponds with an alignment axis for the plurality of jets 141 and the toggles 180, where the plurality of jets 141 and toggles 180 are aligned with that axis in a straight or substantially straight line. Of course, in other embodiments, the jets 141 and toggles 180 may be disposed differently than shown and described (e.g., a random pattern, not aligned in a substantially straight line, etc.). Beneficially, this straight line arrangement between the toggles 180 and the jets 141 may aid a user in visualizing the movement of the jets 141 as one or more of the toggles 180a and 180b are rotated, moved, or otherwise actuated. Fluid provided via the fluid inlet 112 to the plurality of jets 141 is emitted about the axis 200 as the body 110 rotates about the axis 200.

It should be understood that any type of drive mechanism to cause rotation of the body 110 (or a portion thereof) about the axis 200 may be used with sprinkler 100. For example, in one configuration, a motor such as an electric motor may be used. In another example and as described, a fluid-driven rotation mechanism, shown as a turbine or water wheel 113, may be utilized to drive the body 110 about the axis 200. As fluid impacts the water wheel 113, the water wheel 113 is driven to, in turn, cause rotation of the body 110. Included with this drive mechanism may be one or more speed control mechanisms (e.g., gear trains) to control the rotational speed of the body 110 about the axis 200 independent of the fluid pressure provided to the sprinkler 100 via the fluid inlet 112. Thus, those of ordinary skill in the art will readily appreciate and recognize the wide range of drive mechanisms that may be implemented, with all such variations intended to fall within the scope of the present disclosure.

The base 101 (e.g., support structure, support, stand, frame, etc.) may be structured to support the body 110 above a support surface (e.g., ground surface). In this regard and as shown, the base 101 is shown to be configured as a rest-type base where the base 101 rests upon a support surface. In other embodiments, the base 101 may be configured as an insertable-type base (e.g., spike) that facilitates and enables insertion of the base 101 into the support surface. This configuration may be desired to substantially securely hold the base 101 (and, in turn, the oscillating sprinkler 100) in a desired location. It should be understood that many coupling devices or mechanisms may be used to couple the body 110 to the base 101. In one configuration, the body 110 may simply rest in an opening or snap into an opening of the base 101 to suspend the body 110 above or substantially above the support surface. In another configuration, the base 101 may be of integral construction with, for example, the fluid inlet 112 and the end cap 111.

The body 110 or housing is shown as a substantially hollow tube structured to support and couple to many of the components described herein. In this regard and as shown, the body 110 has a cylindrical shape where the axis 200 is aligned or substantially aligned with the longitudinal axis of the body 110. As also shown, the body 110 defines a circular or substantially circular cross-section. As a result, the plurality of jets 141 is provided on a curved surface of the body 110. Additional features of the body 110 are described herein below with respect to FIG. 3.

The fluid inlet 112 is structured to permit and enable coupling of the sprinkler 100 to a fluid source (e.g., a hose connected to a spigot or other fluid source). As such, the fluid inlet 112 defines a fluid entry point for the sprinkler 100. In one embodiment (see FIGS. 3-4), the fluid inlet 112 may define/include a plurality of threads that are rotatably engageable with a complementary plurality of threads on the fluid source. In another embodiment, any type of fluid connection/coupling mechanism or device may be used (e.g., a quick-connect feature, a snap engagement, etc.).

Figure 2:
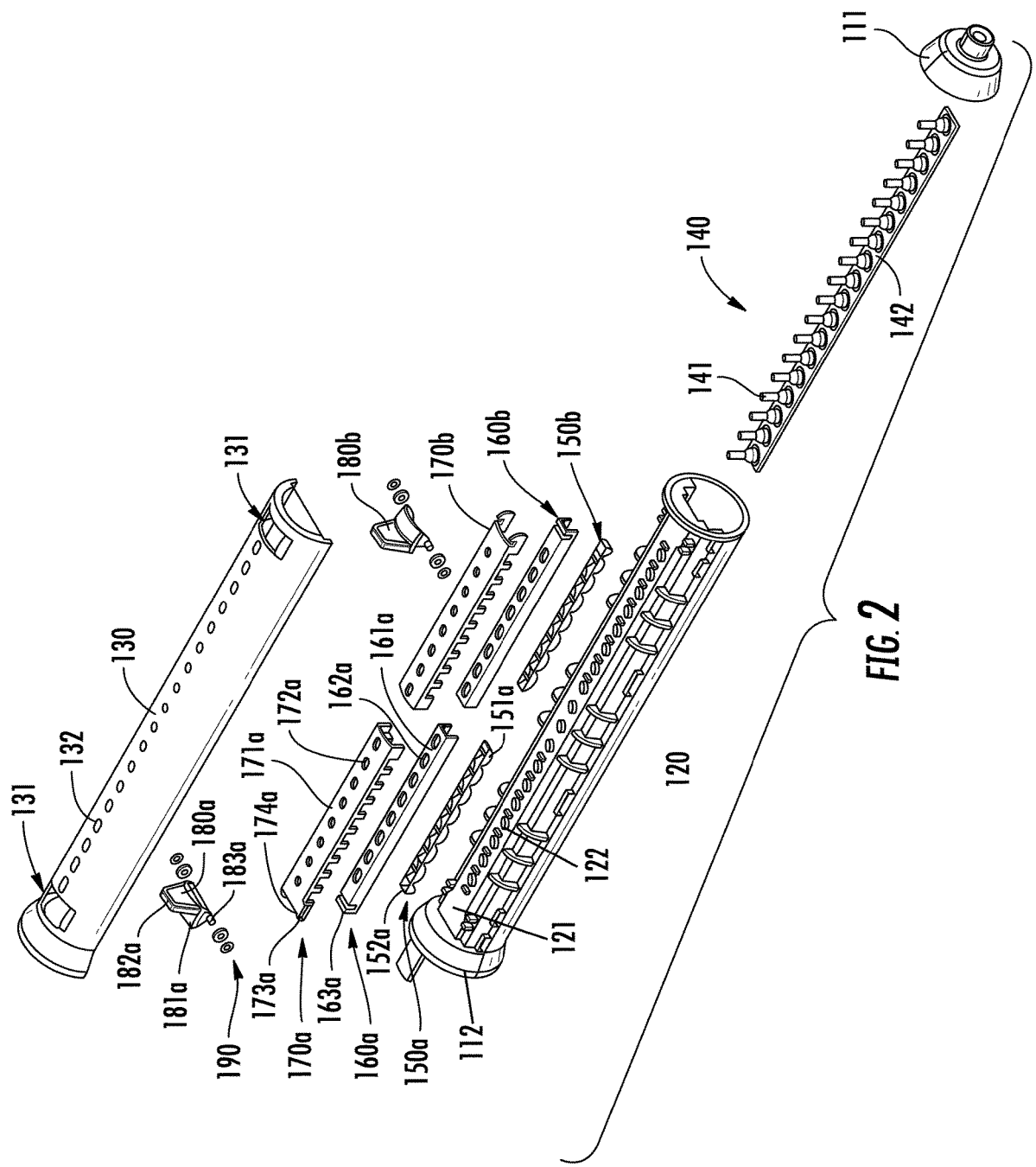
FIG. 2 is an exploded assembly view of the oscillating sprinkler of FIG. 1, according to an exemplary embodiment.
Figure 3:
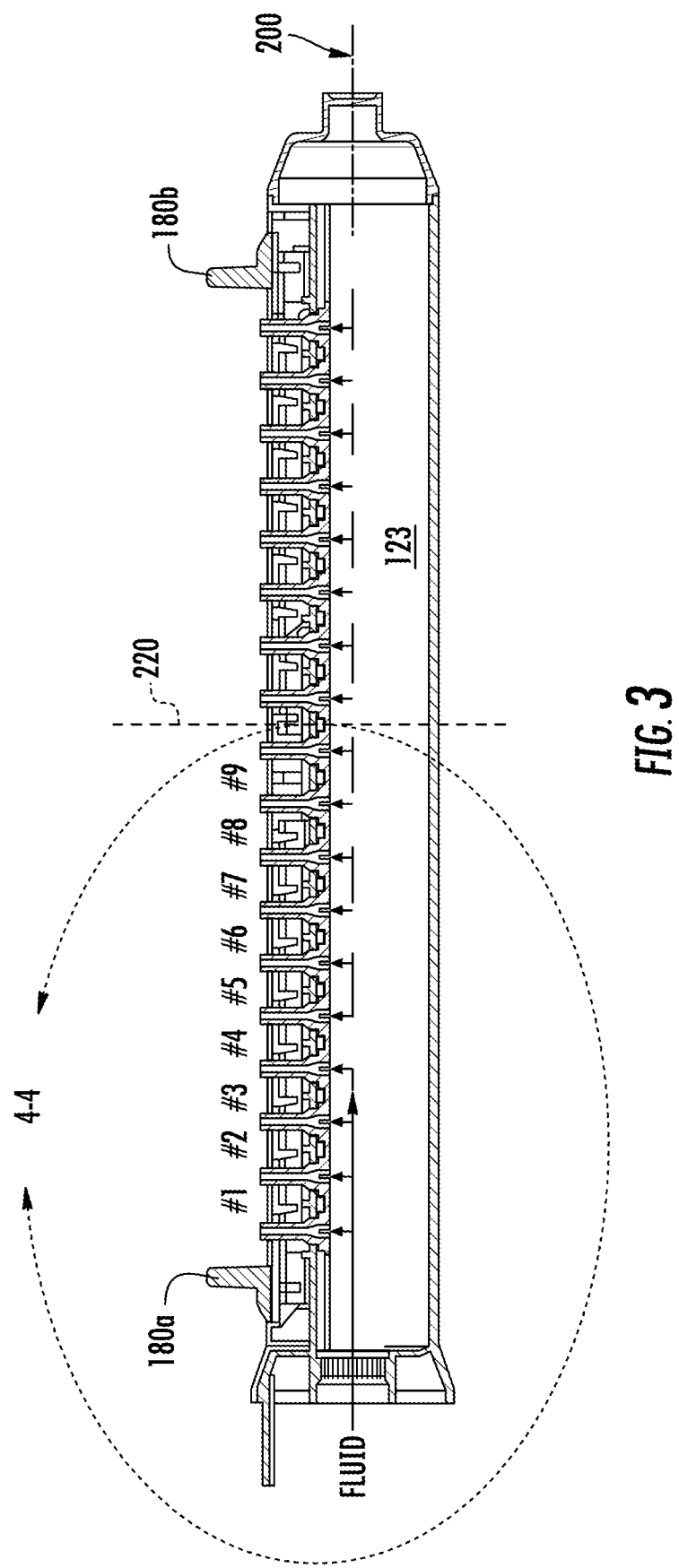
FIG. 3 is a side cross-sectional view of the oscillating sprinkler of FIG. 1 with the base removed and the jets in the narrow position, according to an exemplary embodiment.
Figure 4:
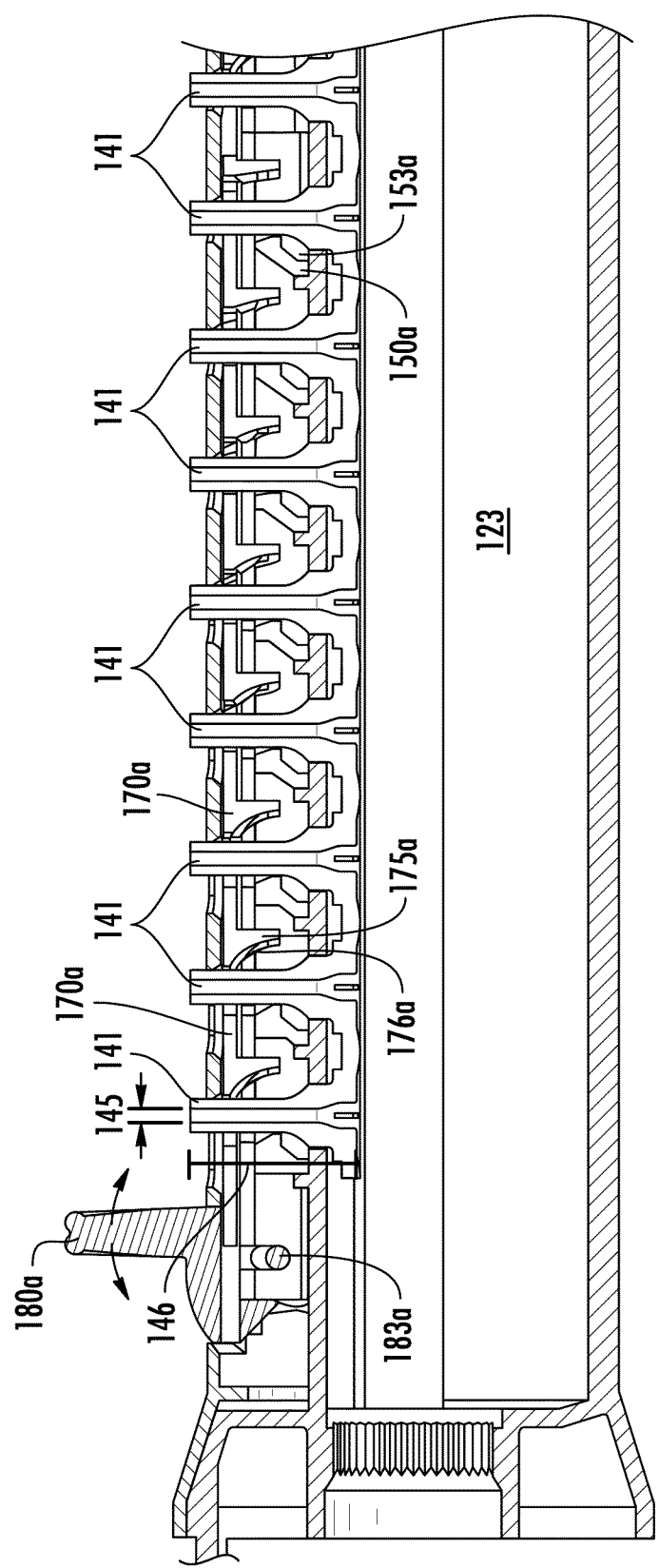
FIG. 4 is a close-up view of section 4-4 of the oscillating sprinkler of FIG. 3, according to an exemplary embodiment.
Figure 5:
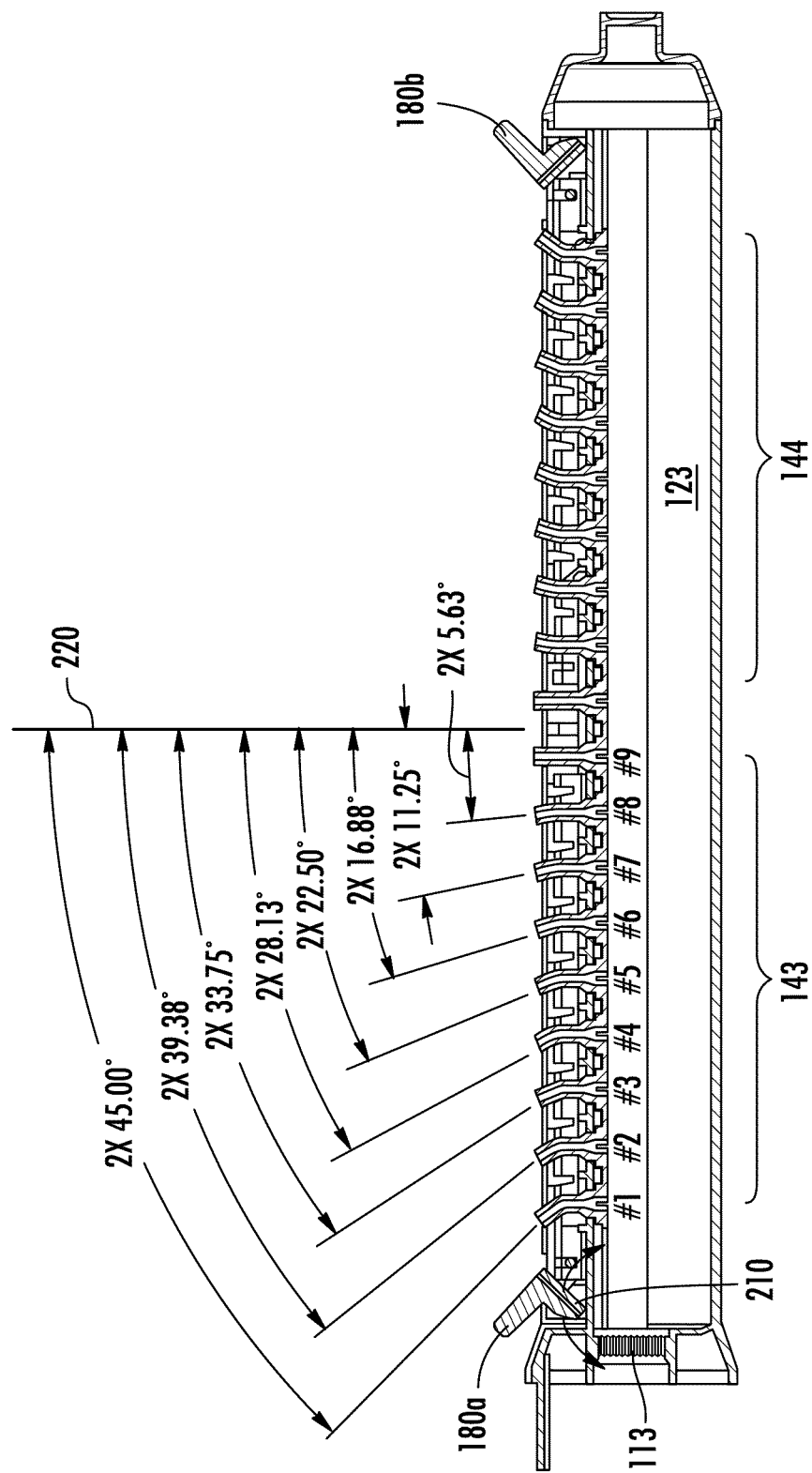
FIG. 5 is a side cross-sectional view of the oscillating sprinkler of FIG. 1 depicting the jets in the wide position, according to an exemplary embodiment.

Referring now to FIGS. 2-5, additional details of the oscillating sprinkler 100 are shown according to various example embodiments. In particular, FIG. 2 depicts an exploded assembly view of the sprinkler 100 with the base 101 removed, FIG. 3 depicts a side cross-sectional view of the sprinkler 100 with the base 101 removed and the plurality of jets 141 in a narrow or starting position, FIG. 4 depicts a close-up view of section 4-4 from FIG. 3, and FIG. 5 depicts a side cross-sectional view of the sprinkler 100 with the base 101 removed and the plurality of jets 141 in an end or wide position. In this regard, the jets 141 may be described herein to be movable from a starting (or narrow) position to an end (or wide) position. The terms "narrow" and "wide" refer to the fluid dispersal coverage area. In the wide position, the jets 141 (or at least some of the plurality of jets) are angled outward and away from the body 110. In the narrow position, the jets 141 (or at least some of the plurality of jets) are positioned in a substantially upright position (i.e., parallel to the vertical plane 220). As a result, the wetted area from the sprinkler 100 is wider in the wide position than in the narrow position. Before turning to the specifics of the operation of the sprinkler 100, a description of each of the components is firstly provided.

As shown, the oscillating sprinkler 100 includes a lower or bottom part 120 of the body 110, an upper or top part 130 of the body 110, a plurality of jets 141 (also referred to herein as nozzles), a pair of nozzle or jet bend controllers 150a and 150b, a pair of bottom sliders 160a and 160b, a pair of top sliders 170a and 170b, and a pair of toggles 180a and 180b. It should be understood that each component in the pair of nozzle bend controllers 150a and 150b, bottom sliders 160a and 160b, top sliders 170a and 170b, and toggles 180a and 180b are identical in structure to each other. Thus, while only one of the components may be described herein below in detail (in particular, only the left-hand side set of components, which are the designated "a" components), it should be understood that the same configuration applies to the other component. That being said, it should also be understood that in other embodiments, the length of the sprinkler 100 may be reduced such that only one of each the aforementioned pairs of components are utilized. Thus, the presence of each pair of components is not meant to be limiting as the present disclosure contemplates other configurations that are intended to fall within the scope of this document.

As mentioned above, the body 110 includes a bottom part 120 (e.g., section, housing, portion, etc.) and a top part 130. In this regard, the body 110 may be constructed (at least partly) from by two parts. The bottom part 120 includes a frame 121 that defines a plurality of apertures 122 (e.g., openings, holes, etc.) and a fluid passage 123 (e.g., channel, etc.) defined by the body 110. The fluid passage 123 is fluidly coupled to the fluid inlet 112, such that fluid may be provided from the inlet 112 to the passage 123 and, eventually, the jets 141. As shown, the fluid passage 123 is coaxial or substantially coaxial with the axis 200. The fluid passage 123 may have any shape and size desired by the designer. In the example shown, the fluid passage 123 corresponds with a circular or substantially circular cross-sectional shape. Of course, in other embodiments, any shape and size may be used.

The frame 121 (e.g., rail, etc.) is disposed on a top or upper part of the fluid passage 123 (based on the viewpoint in FIG. 3). In this example, the frame 121 is a predominately flat component of unitary construction. The frame 121 defines a plurality of apertures 122. The apertures 122 are in fluid communication with the fluid passage 123. In this regard, fluid in the passage 123 may escape via the apertures 122. In the example shown, the apertures 122 are disposed in a straight or substantially straight line along the axis 200. In other configurations, the apertures 122 may be offset relative to each other or arranged in a different, desired pattern. As shown, the apertures 122 correspond with a shape of the jets (e.g., circular shaped). Of course, in other embodiments, a variety of shapes may be used (e.g., slot or oval shaped, rectangular, square, etc.). As described herein below, the frame 121 and apertures 122 couple to the plurality of jets 140 when the sprinkler 100 is assembled.

The upper part 130 (e.g., section, housing, portion, etc.) couples to the bottom part 120 to form the body 110. As shown, the upper part 130 includes a pair of openings 131 (e.g., apertures, voids, etc.) structured to receives the toggles 180a and 180b (one toggle per opening 131) and a plurality of apertures 132 (e.g., holes) arranged longitudinally across a top or upper surface of the upper part 130, such that the openings 132 are aligned or substantially aligned with the axis 200. Coupling of the upper part 130 to the lower part 120 may be via any type of coupling mechanism including, but not limited to, a snap engagement, one or more fasteners (e.g., screws, pins, etc.), an adhesive (e.g., glue), an interference type relationship, etc. As shown, the openings 132 have a slot or oval type shape, where the length of the slot (i.e., the long portion) is oriented along the axis 200. In this regard, each jet 141 is configured to extend through each opening 132 (i.e., one jet per opening). The slot-shape is beneficial due to the structure of the opening 132 itself then not impacting or restricting the movement capability of the jets 140. As a result, the jets 140 may move and, particularly, angularly move with respect to the openings 132. This operation is described more fully herein below.

The jet rail 140 includes a plurality of jets 141 (also referred to herein as nozzles) extending upward and away from a body 142. The jet rail 140 is divided up into a first plurality of jets 143 and a second plurality of jets 144. This is done to signify which of the pluralities of jets 141 are controllable by which toggle 180a or 180b. In this regard and as described herein, the first plurality of jets 143 may be controllable or movable by the toggle 180a on the left-hand side (close to the fluid inlet 112) while the second plurality of jets 144 may be controllable or movable by the toggle 180b on the right-hand side (close to the end cap 111).

Referring more particularly to FIG. 4, the jet rail 140 is insertable underneath the frame 121. In this regard, each jet 141 in the plurality of jets 141 extends up and through the apertures 122. Coupling of the jet rail 140 to the frame 121 may be performed in any of a variety of manners. In one configuration, an adhesive is applied to at least one of the frame 121 and the jet rail 140 to bond the two components together. In another embodiment, the frame 121 defines or includes features that enable the coupling (e.g., a snap-engagement, etc.). In still another embodiment, one or more fasteners may be used. In any of these configurations, coupling between the frame 121 and the jet rail 140 may be performed in a fluid tight manner or substantially a fluid tight manner. In this regard, fluid provided to the passage 123 can only be directed through each of the pluralities of jets 141 as opposed to a space or crevice between the jet rail 140 and the frame 121. Beneficially, such a feature avoids leaks there-between.

According to the example shown, the jets 141 and body 142 are of integral construction (e.g., a one-piece component). Further, the jet rail 140 is constructed from a material that is capable of bending and flexion. In particular, the jet rail 140 is constructed from thermoplastic elastomers (TPE) or thermoplastic rubber (TPR). Of course, in other embodiments, different materials that enable a bending of the jets 141 may be used. Thus, the jets 141 have a resilient bending characteristic (i.e., able to bent and spring or revert back to a default shape or position). As described herein below, the bending capability of the jets 141 enables them to be controllably bent/moved into one or more desired positions. Beneficially, the bending of the jets 141 alleviates the need for complicated mechanisms that would otherwise be used to cause the jets 141 to move if they were constructed from a rigid material (e.g., hard plastic).

With reference to FIG. 4 and as shown, each jet 141 has a width 145 and a height or length 146. The width 145 corresponds with an internal opening size of the jet 141 (in this example an internal diameter due to the cylindrical shape of the jet 141), which fluid is passed through. The height 146 corresponds with the total length of the jet 141. In the example shown, the jet 141 has a substantially cylindrical shape, such that the width 145 corresponds with a substantially circular cross-sectional shape. Further, the length 146 is chosen to just extend past the top part 130. Of course in other embodiments, many different structural configurations for the jets 141 may be used. For example, the width 145 may be variable and correspond with a conical shape to affect a desired nozzle fluid emission property. As another example, one or more protrusions may be inserted within the interior part of the jet (e.g., ribs, splines, spiral rib, etc.) that may also be used to impart a desired nozzle fluid emission property (e.g., laminar emission flow, rotation of the fluid emitted, etc.). As still another example, the height of the jet may be chosen to be below the upper part 130, above the upper part more than depicted in the FIG. 4, and/or different for each jet or for at least some of the jets in the pluralities of jets. As an example, some of the jets may have a length that corresponds with them being just above the upper part 130 while other jets may have a length that corresponds with them being below the upper part 130. In this regard, the length 146 and width or internal diameter 145 of each jet 141 may individually be varied in order to influence the shape and evenness of the resulting coverage area from the sprinkler 100. Accordingly, those of ordinary skill in the art will appreciate the wide configurability of the structure of the jets.

The nozzle or jet bend controllers 150a and 150b are fixedly coupled to the body 110 to provide a structure that engages with the jets 141 (or at least some thereof) to control or partly control the bending/angular movement of the jets 141. As shown, a first jet bend controller 150a cooperates with the first plurality of jets 143 while a second jet bend controller 150b cooperates with the second plurality of jets 144. In another configuration, a single jet bend controller may be used to engage or cooperate with all of the jets.

In the example shown, the jet bend controllers 150a and 150b are coupled to the body 110 and, in particular, the frame 121 in a stationary manner. In this regard, once coupled, the jet bend controllers 150a and 150b remain stationary during use of the oscillating sprinkler 100.

As shown, the jet bend controller 150a includes a body 151a defining a plurality of openings 152a (e.g., apertures, holes, etc.). When the jet bend controller 150a is coupled to the frame 121, the plurality of openings 152a are arranged to align or substantially align with the openings 122 in the frame 121 as well as the openings 132 in the upper part 130. As a result, each jet 141 in the first plurality of jets 143 may extend through the openings 122, openings 152a, and openings 132. Thus, the openings 152a are disposed/arranged in a manner to match or substantially match the opening pattern used in the corresponding structures (as well as the top slider 170a and bottom slider 160a, which is described below).

As also shown, the jet bend controller 150a includes a plurality of bend structures 153a, each of which selectively engage with a jet 141 during operation of the oscillating sprinkler 100. As shown, each bend structure 153a is disposed proximate to a base of the jet 141 (i.e., closer to the frame 121 than to the upper part 130). As a result, the bend structure 153a may provide a counter force to a force applied by the top slider 170a to an upper part of the jet 141 to, in turn, enable only substantially the upper part of the jet 141 to bend/move into a desired angle of fluid emission. It should be understood that the precise structure of the bend structure 153a is highly configurable. As a result, the bend/flexion/angular movement of the jet 141 is also highly configurable. For example, in other configuration, the bend structure may extend closer to the upper part 130, such that a smaller part of the jet 141 bends relative to the embodiment shown in the Figures. In another example, the surface of the bend structure that engages with the jet 141 may have a different contour. As a result, the angular movement properties of the jet 141 may differ from that shown and described herein.

As mentioned above, the sprinkler 100 also includes a pair of bottom sliders 160a and 160b. A first bottom slider 160a selectively engages with the first plurality of jets 143 while a second bottom slider 160b selectively engages with the second plurality of jets 144. In this regard, the first bottom slider 160a is aligned and cooperating with the first jet bend controller 150a, the first top slider 170a, and the first plurality of jets 143 while the second bottom slider 160b is aligned and cooperating with the second jet bend controller 150b, the second top slider 170b, and the second plurality of jets 144. In the example shown, each of the bottom sliders 160a and 160b are of unitary construction. Of course, in other embodiments, the bottom sliders 160a and 160b may be constructed from an assembly of components. Further and similar to the jet bend controllers 150a and 150b and the upper sliders 170a and 170b, in other configurations, only one bottom slider may be used. Such a configuration may be used with only one toggle and for a relatively shorter longitudinal length sprinkler 100 than that depicted in Figures.

As shown, the bottom slider 160a includes a body 161a that defines a plurality of apertures 162a (e.g., openings, holes, etc.) and a slot 163a. When the sprinkler 100 is assembled, the apertures 162a align with the holes 152a of the first jet bend controller 150a, the corresponding holes 122 of the frame 121, and the holes 172a of the top slider 170a, and the corresponding holes 132 of the upper part 130. In this regard, the apertures 162a are aligned with each of the aforementioned holes. As a result, the first plurality of jets 143 extend through each of the aforementioned holes (one jet per each hole). Thus, the hole arrangement used in these components matches or substantially matches each other.

As described herein below, the bottom sliders 160a and 160b are movable by the toggles 180a and 180b, respectively, to in turn move at least one jet in the plurality of jets 141. In this regard and with reference to the first bottom slider 160a, the first bottom slider 160a is shown to define a slot 163a. The slot 163a is defined by the body 162a in an orientation that is perpendicular or substantially perpendicular to the axis 200 when the jets 141 are arranged in the upright position, like the viewpoint shown in FIG. 1. While many sizes and shapes of the slot 163a are possible, according to the present disclosure, the slot 163a is sized and shaped to receive a projection of the toggle 180a. In this regard, the toggle 180a is movably coupled to the bottom slider 180a. As mentioned above and as described herein below, movement of the toggle 180a causes or moves the bottom slider 160a. It should be understood that in an alternate embodiment, the bottom sliders 160a and 160b may be eliminated from the sprinkler 100. Thus, the presence of the bottom sliders 160a and 160b is not meant to be limiting.

As mentioned above, the sprinkler 100 includes a pair of top sliders 170a and 170b. The first top slider 170a selectively engages with the first plurality of jets 143 (or a portion thereof) while the second top slider 170b selectively engages with the second plurality of jets 144 (or a portion thereof). In this regard, the first top slider 160a is aligned and cooperating with the first jet bend controller 150a, the first bottom slider 160a, and the first plurality of jets 143 while the second top slider 170b is aligned and cooperating with the second jet bend controller 150b, the second bottom slider 160b, and the second plurality of jets 144. In the example shown, each of the top sliders 170a and 170b are of unitary construction. Of course, in other embodiments, the top sliders 170a and 170b may be constructed from an assembly of components. Further and similar to the jet bend controllers 150a and 150b and the bottom sliders 160a and 160b, in other configurations, only one top slider may be used. Such a configuration may be used with only one toggle and for a relatively shorter longitudinal length sprinkler 100 than that depicted in Figures.

As shown, the top slider 170a is shown to include a body 171a defining a plurality of apertures 172a, a projection 173a defining a slot 174a, and a plurality of projections 175a extending downward and away from the body 171a. The projection 173a extends outward and away from the body 171a. Thus and due to being of unitary construction (in this embodiment), the projection 173a is an extension of the body 171a. When the sprinkler 100 is assembled, the apertures 172a align with the holes 152a of the first jet bend controller 150a, the corresponding holes 122 of the frame 121, the holes 162a of the bottom slider 160a, and the corresponding holes 132 of the upper part 130. As a result, the first plurality of jets 143 extend through each of the aforementioned holes. Thus and as mentioned above, the hole arrangement used in these components matches or substantially matches each other.

As also mentioned above, the body 171a includes a plurality of projections 175a (e.g., juts, members, extensions, benders, etc.) that extend downward and away from the body 171a (based on the viewpoint in FIG. 4). Each projection 175a defines a surface 176a. The surface 176a (also referred to herein as an engagement surface or jet engagement surface) may selectively engage a jet 141 (i.e., one projection per jet). In the example shown, there is one less projection 175a than the number of jets in the first plurality of jets 143 (same is true with the top slider 170b and the second plurality of jets 144). In this regard, the last jet (i.e., the jet positioned furthest from the toggle 180a; jet number 9 in FIG. 5) does not engage with a projection 175a during operation of the sprinkler 100. In this regard, this jet 141 (jet #9 in FIG. 5) remains stationary and substantially upright (no bending except for that which may be caused from the fluid pressure). In another embodiment, the slider may include more than one less projection relative to the number of jets (i.e., two jets may remain stationary, three jets may remain stationary, etc.). In still another embodiment, the number of projections may match the number of jets. In yet another embodiment, rather than the last jet not engaging with a projection 175a, a different positioned jet or jets may not engage with a projection 175a (e.g., jet #3 may not have a corresponding projection 175a). Thus, those of ordinary skill in the art will appreciate the high amount of configurability that may be utilized with the number and position of the projections on the top slider 170a.

As mentioned above, the surface 176a selectively engages with a corresponding jet 141 during operation of the sprinkler 100. As also mentioned above and in this example, the plurality of jets 141 are constructed from a flexible material, which makes them able to be bent or moved. With reference to FIG. 4, in the example shown, the surface 176a of the projection 175a that selectively engages with the first jet 141 has a non-planar shape. In particular, the surface 176a of the projection 175a that selectively engages with the first jet 141 has an arcuate, curved, or sloped shape. In this regard, the surface 176a of the projection 175a that selectively engages with the second jet 141 also has a non-planar shape, which corresponds with a curved or sloped shape. In operation, the slope or curvature of the surfaces 176a bend, move, rotate, or otherwise force the corresponding jet 141 into the same or similar angle/shape when the jet 141 engages with that projection 175a and surface 176a. Thus, when the surface 176a is engaged with the jet 141, the engaged part of the jet 141 bends to match the contour of the surface 176a.

However, as shown, the angle of curvature of the surfaces 176a of the projections 175a is variable. In this example, the largest slope or curvature is provided in the surface 176a of the projection 175a that selectively engages with the first jet 141. This slope or curvature decreases down to being substantially planar (i.e., no curve) at surface 176a of the projection 175a that engages with the eighth jet 141. As a result, the varying angle or slope of the surfaces 176a of the projections 175a corresponds with a varying angle of curvature/contour capability of the jets 141 starting from the first jet 141 to the ninth jet 141.

As described herein and in the example shown, the varying angle of curvature from the eighth jet 141 to the first jet 141 corresponds with a linear relationship where each angle is a multiple of a predefined and selected angle (in this case, 5.63 degrees) relative to a vertical plane 220 (see FIG. 5). Thus, the angle at the first jet is forty-five (45) degrees in the end position while the angle of the eighth jet is 5.63 degrees in the end position. In this case, Applicant has chosen the first jet 141 to correspond with an angle of 45 degrees in the end position (i.e., the wide position). Because there are eight jets in this configuration (as mentioned above, the ninth jet remains stationary), Applicant chose the angle of curvature to linearly relate to each of the jets (i.e., 45/8=5.63). Thus, in other configurations, there may be less than or more than eight jets that are impacted by the projections 175a, less than or more than nine jets total, a different chosen end angle for the first jet (e.g., sixty degrees, fifty degrees, etc.), a desire to make the angle of separation between each jet in the end position to be non-linearly related (e.g., not separated by a constant angle like shown in the figures), etc. Accordingly, those of ordinary skill in the art will readily recognize and appreciate the high configurability of the end position of the jets of the present disclosure. In this regard and along these same lines, it should be understood that in other configurations, the angle of curvature/slope/contour of the surfaces 176a (and, in turn, the bend angles of the jets 141) may be constant (i.e., non-variable), varying by a different degree than what is depicted and described herein, and so on. All such variations are intended to fall within the scope of the present disclosure.

As described herein below, the top sliders 170a and 170b are movable by the toggles 180a and 180b, respectively, to in turn move at least one of the pluralities of jets 141. In this regard and with reference to the first top slider 170a, the first top slider 170a is shown to define a slot 174a. The slot 174a is positioned in an orientation that is perpendicular or substantially perpendicular to the axis 200 when the jets 141 are arranged in the upright position like shown in FIG. 1. In this regard, the slot 174a is aligned or substantially aligned with the slot 163a of the bottom slider 160a. As such and similar to the configuration of the slot 163a, according to the present disclosure, the slot 174a is sized and shaped to receive a projection of the toggle 180a. In this regard, the toggle 180a is movably coupled to the top slider 170a. As mentioned above and as described herein below, movement of the toggle 180a moves the top slider 170a. The top slider 170b has an identical structure and function in this example except for engaging with the toggle 180b.

As mentioned above, sprinkler 100 also includes a pair of toggles 180a and 180b (switches, knobs, levers, controllers, etc.). The first toggle 180a cooperates or works with the first plurality of jets 143, the first top slider 170a, the first bottom slider 160a, and the first jet bend controller 150a. The second toggle 180b cooperates or works with the second plurality of jets 144, the second top slider 170b, the second bottom slider 160b, and the second jet bend controller 150b. The toggle 180a includes a body 181a have a tab 182a extending outward and away from the body 181a and a projection 183a. In the example shown, the toggle 180a is of unitary construction (e.g., a one-piece component). Of course, in other embodiments, the toggle 180a may be constructed from two or more components. The toggle 180b may have an identical structure as the toggle 180a, such that the description contained herein with respect to the toggle 180a may be equally applicable with the toggle 180b.

The projection 183a is sized and structured to be received or at least party received in the slot 163a of the first bottom slider 160a and the slot 174a of the first top slider 170a. In the example shown projection 183a is a cylindrical-shaped pin. Of course, in other embodiments, a different shape and size of the projection 183a may be implemented. In one configuration, the projection 183a may rest in the slots 163a and 174a. In another configuration, the projection 183a may form a snug-fit (e.g., tight engagement, such that the components touch each other). In yet another configuration and as shown, a plurality of fasteners 190 may be used to securely or relatively securely fasten the toggle 180a to the sprinkler 100 (and, in particular, to the sliders 160a and 170a). As shown, the first top slider 170a is relatively wider than the bottom slider 160a. As a result, the projections 173a are disposed outside of the bottom slider 160a (and, in particular, the slot 163a). However and due to the width, the slot 163a may be positioned in between the projections 173a. As a result, the projection 183a of the toggle 180a may engage with each slot 174a and 163a.

According to the embodiment depicted, the toggle 180a is movably and, in particular rotatably, coupled to the body 110. More particularly, the toggle 180a is pivotably or rotatably coupled to the frame 121. In this regard, the toggle 180a rotates about an axis 210 perpendicular to the axis 200 (based on the viewpoint in FIG. 1). Coupling of the toggle 180a to the frame 121 may be via any suitable mechanism (e.g., pin, etc.). In some configurations, a biasing and/or locking element/mechanism may be included therewith. The biasing element may bias the toggle into a desired position (e.g., the wide position or the narrow position). For example, a spring may be coupled to the toggle 180a, whereby the spring forces, urges, or otherwise biases the toggle into the narrow position. The locking mechanism may be structured to hold or retain the toggle 180a in a desired position. For example, a magnet may be used to apply a magnetic force to the toggle 180a to hold the toggle 180a in the wide position. As another example, a spring-release mechanism may be used. As still another example, various types of ratchet mechanisms may be used (e.g., a ratchet and pawl). Thus, those of ordinary skill in the art will appreciate the numerous types of coupling, locking, and/or biasing mechanisms that may be used with the toggle; all such types of mechanisms are intended to fall within the spirit and scope of the present disclosure.

Due to the coupling of the toggle 180a with the top and bottom sliders 170a and 160a, the sliders 170a and 160a may move when the toggle 180a is rotated. In particular, the tab 182a (e.g., user engagement portion) is a handle or switch for a user to move or actuate to adjust an angle of fluid discharge from the first plurality of jets 143. As described herein, the rotation of the tab 182a moves at least one of the top slider 170a and the bottom slider 160a to controllably affect the fluid dispersal width from the sprinkler 100. Before turning to the details of operation of the sprinkler 100, a description of the assembly of the sprinkler 100 is provided.

After assembly of the bottom part 120 of the body 110, the jet rail 140 is coupled to the bottom part 120 of the body 110. In particular, the jets 141 are inserted through the openings 121 of the frame 121. As mentioned above, coupling of the jet rail 140 to the frame 121 may be via any suitable mechanism (e.g., an interference fit relationship between the jets 141 and the openings 122, one or more fasteners, an adhesive, a combination thereof, etc.). Subsequently, the jet bend controllers 150a and 150b are coupled to the frame 121 of the bottom part 120 of the body 110. Coupling of the jet bend controllers 150a and 150b to the frame 121 may also be via any suitable mechanism (e.g., a snap engagement between the controllers 150a and 150b and the frame 121, one or more fasteners, an adhesive, a combination thereof, etc.). In any coupling process used, the jet bend controllers 150a and 150b are coupled to the frame 121 in a fixed or stationary manner, such that the jet bend controllers 150a and 150b remain stationary during operation of the sprinkler 100. Then, the top and bottom sliders 170a, 170b and 160a, 160 are aligned with the jets 141, such that the jets 141 are able to extend through the openings of each of the sliders. The toggles 180a and 180b are then coupled to the sliders by engaging the projections of the toggles 180a and 180b with the slots of each pair of sliders. The fasteners 190 may then be used to retain the toggles 180a and 180b to each of the sliders. Then, the toggles 180a and 180b are coupled to the frame 121 of the lower part 120 of the body 110. Finally, the top part 130 of the body 110 is coupled to the lower part 120 to form the body 110 and enclose the fluid passage 123. The toggles 180a and 180b extend through each opening 131 once coupled. Similarly, the jets 141 extend through the openings 132 once assembled.

Based on the foregoing and referring now to FIG. 5, in combination with FIGS. 1-4, operation of the sprinkler 100 may be described as follows. As mentioned above, the first and second pluralities of jets 143, 144 may be movable from a starting (or narrow) position to an end (or wide) position. For reference purposes, FIG. 3 depicts the starting position while FIG. 5 depicts an end position. For ease of reference, the jets 141 have been number first through ninth.

In FIG. 3, the jets 141 are oriented perpendicular or substantially perpendicular to the axis 200. In this position, the tab 182a of the toggle 180a is also oriented in a perpendicular or substantially perpendicular position relative to the axis 200. Thus, the tab 182a is parallel or substantially parallel to the vertical axis 220. In this regard and as described herein, beneficially, the orientation of the tab 182a (i.e., the angle of the tab 182a) is configured to match or substantially match the angle of at least one jet 141. With reference to FIG. 4, as shown, in the starting position, the projections 175a and surfaces 176a of the top slider 170a are positioned away from the jets 141 (i.e., there is a gap or a space between the two components). Further, the first jet 141 is in a position/orientation that is substantially upright (i.e., parallel to the tab 182a and the vertical plane 220). Thus, the position/angle of the first jet 141 relative to the vertical plane 220 matches that of the tab 182a of the toggle 180a.

Moving jets 141 to the end position in FIG. 5 may be described as follows. The toggle 180a is rotated by a user about the pivot point/connection (defined as the coupling point between the toggle 180a and the frame 121) counterclockwise (based on the viewpoint in FIG. 5). Due to the engagement with the top slider 170a and the bottom slider 160a, the top slider 170a and bottom slider 160a also move. In particular, the sliders 170a and 160a slide or translate towards the fluid inlet section 112 (i.e., the sliders 170a and 160a move in a direction corresponding to the rotation direction of the toggle 180a). In conjunction, the jet bend controller 150a provides a stationary surface for the jets 141 to engage with and, in turn, bend upon (particularly, the bend structure 153a). When the end position is obtained, the projections 175a force the jets 141 (or at least the top portions thereof) into the desired end position. In this regard, during movement to the end position, the bottom slider 160a plays no role.

In this example, the desired end position corresponds with an angle of forty-five (45) degrees for the first jet 141. According to the present disclosure, the angle of the toggle 180a (particularly, the tab 182a) relative to the vertical plane 220 matches or substantially matches the angle of the first jet 141. Thus, a visual indicator is provided to the user: move the toggle 180a to a desired angle knowing that the first jet will be at or substantially at that angle. The remaining second through eighth jets 141 are disposed at a constant decreasing angle relative to the vertical plane 220 in this example. In particular, the first through eighth jets 141 have a constant angle of separation between each successive jet 141 (i.e., the third jet is at an approximate 33.75 degree angle while the second jet is at an approximate 39.38 degree angle and the fourth jet is at an approximate 28.13 degree angle, which corresponds with a decreasing amount of 5.68 degrees between each jet going from the first to the eighth and ninth jets). As mentioned above, in other configurations, this linear relationship between the jets may be replaced by a different desired relationship or none at all.

After a movement to the end or wide position, a user may desire to decrease the width of coverage of the sprinkler 100 and move the jets 141 back to the starting position (i.e., FIG. 3). As such, the user may grab the tab 182a and move or rotate the toggle 180a clockwise (based on the view in FIG. 5)(i.e., towards the end cap 111). Due to the coupling with the top slider 170a and the bottom slider 160a, movement of the toggle 180a causes, forces, or otherwise pushes the sliders 170a and 160a to move (and, in particular, slide or translate) away from the fluid inlet 112 and towards the end cap 111. In operation, the body 171a that defines the apertures 172a impacts, contacts, or engages with the jet 141 to push the jet 141 away from the toggle 180a. In this regard, the surfaces 176a move away or disengage from the jets 141. In operation, the top slider 170a pushes the first jet 141 first, the second jet 141 second, the third jet 141 third, and so on in a sequential manner. The bottom slider 160a pushes the fifth, sixth, seventh, and eighth jets 141 before the top slider 170a contacts those jets to push them away from the toggle 180a. Thus, the rotational movement of the toggle 180a towards the other toggle 180b (or end cap 111, or towards the jets 141) functions to straighten the jets 141 (i.e., move them back towards the starting position, which is in an orientation that is parallel or substantially parallel to the vertical plane 220). However and like the wide position, the position of the toggle 180a (particularly, the tab 182a) then matches or substantially matches the position of the first jet 141 (i.e., jet closest to the toggle 180a). In this regard, the tab 182a and the first jet 141 are oriented in a manner that is substantially upright/parallel to the vertical plane 220. Applicant has determined that the jet 141 angles at the end (e.g., fifth through eighth jets) are slightly bent (i.e., approximately two (2) degrees relative to the vertical plane) rather than being completely upright. That being said, in other embodiments, more or less bend may be implemented with some or all of the jets in the narrow position. Thus, in operation, the user may control the width of the fluid stream dispersed from the oscillating sprinkler 100.

Despite being described above as the toggle 180a being movable between the narrow or starting position and the end or wide position, in certain embodiments, the toggle 180a may be moved to various intermediate positions between the narrow and wide positions as well. Thus, a wide amount of control may be implemented in addition to the aforementioned dual-modes of operation described above.

Beneficially, the toggles 180a and 180b enable independent control of each of the pluralities 143 and 144 of jets 141. As a result, a user may place the first plurality of jets 143 in the wide position and the second plurality of jets in the narrow position (or, vice versa). Thus and compared to conventional oscillating sprinklers, an enhanced amount of control may be provided. Further, by aligning the toggles 180a and 180b along or substantially along the axis 200 (instead of offset like conventional oscillating sprinklers), placing the toggles 180a and 180b close to or adjacent the jets 141, and matching or substantially matching the first jet angle with the toggle angle, users may be provided with a visual cue concerning the discharge angle of the sprinklers as well as an ease of use advantage over conventional oscillating sprinklers, which may require turning the fluid on/off to see the precise discharge angle.

Additionally, and beneficially, in one configuration an indication of the amplitude of change of the nozzle angle during adjustment of the nozzle or jet angle may be provided (e.g., a change in color or texture). For example, in one embodiment, the toggles 180a and 180b may include stripes of different colors on the curved part of the body 181a or 181b between the user tab 182a and the end of sprinkler 100, whereby the visible stripe of color shows the amplitude change (alternatively or additionally, the change in colors may be located on a different spot on the toggle). As another example, various colors may be provided on the top slider, such that as the top slider is moved a different color may be visible (e.g., through the openings 132 of the top part 130). Different colors may have different meanings such that a different color indicates a different change in amplitude. As still another example, colors may be used with another component of the sprinkler 100 to show the change in amplitude of the nozzle angle during adjustment by the toggle. Regarding texture, a change in feel may be provided to the user using the toggle (e.g., an increasing amount of resistance as the jet angle is increased) to indicate the change in amplitude. Thus, those of ordinary skill in the art will appreciate the additional indicators that may be used to show/indicate the change in jet angle. These indicators may be in addition to the angle of the toggle and particularly the tab, which may match or substantially match the first jet angle to show the jet angle. Thus, a plethora of cues or indicators may be used to provide information regarding the anticipated operation of the sprinkler 100 based on the adjustments provided by the user. As a result, an ease of convenience benefit may be experienced by the user.

It should be understood that the present disclosure may be applicable with stationary sprinklers as well. For example, rather than oscillating about the axis 200, the sprinkler 100 may be stationary. In this regard, the present disclosure may be applicable with any type of sprinkler with movable jets or nozzles.

As mentioned herein above with respect to certain components, it should further be understood that one or more additional/other components of the sprinkler 100 may be constructed as a unitary body (e.g., a one-piece component) or as an assembly of components. Further, these components may be constructed from any suitable material including, but not limited to, a plastic material, rubber, a metal or metal alloy material, and/or any combination therewith. For example, the use of engineered plastics may provide a preferred combination of light weight and strength. According to other embodiments, a number of alternate materials can be used to produce the sprinkler: cast or machined aluminum or brass could be utilized in the construction, a variety of steels, various composites, and/or any combination thereof. Thus, those of ordinary skill in the art will appreciate the high configurability of the components.

It is important to note that the construction and arrangement of the elements of the irrigation device, shown as an oscillating sprinkler, with an intuitive width control mechanism is illustrative only. Although only a few embodiments have been described in detail in this disclosure, those skilled in the art who review this disclosure will readily appreciate that many modifications are possible without materially departing from the novel teachings and advantages of the subject matter recited.

Further, all such modifications are intended to be included within the scope of the present disclosure. Other substitutions, modifications, changes and omissions may be made in the design, operating conditions and arrangement of the preferred and other exemplary embodiments without departing from the spirit of the present disclosure possible (e.g., variations in sizes, dimensions, structures, shapes and proportions of the various elements, values of parameters, mounting arrangements, use of materials, colors, orientations, etc.). Thus, one of ordinary skill in the art will appreciate that many modifications, alterations, or changes may be imparted into the tools disclosed herein without departing from the spirit and scope of the present disclosure.

For the purpose of this disclosure, the term "coupled" or other similar terms, such as "attached," means the joining of two members directly or indirectly to one another. Such joining may be achieved directly with the two members or the two members and any additional intermediate members being attached to one another and the two members. For example and for the purposes of this disclosure, component A may be referred to as being coupled to component B even if component C is an intermediary, such that component A is not directly connected to component B. On the other hand and for the purposes of this disclosure, component A may be considered coupled to component B if component A is directly connected to component B (e.g., no intermediary). Such joining may be stationary or moveable in nature. Such joining may be permanent in nature or may be removable or releasable in nature.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present disclosure as expressed in the appended claims.

What is claimed is:
1. An irrigation device, comprising:
a body defining a fluid passage;
a slider movably coupled to the body of the irrigation device, wherein the slider includes a body defining a plurality of apertures and a plurality of projections extending away from the body;
a plurality of flexible jets coupled longitudinally to the body of the irrigation device, wherein the plurality of flexible jets receive fluid from the fluid passage, and wherein each jet of the plurality of flexible jets is received by an aperture in the plurality of apertures of the slider; and
a toggle rotatably coupled to the body of the irrigation device and to the slider, wherein the toggle is rotatably coupled to the body in substantial alignment with the plurality of flexible jets, and wherein rotation of the toggle in a first direction moves the slider to cause at least one projection of the slider to engage with at least one jet of the plurality of flexible jets to adjust a position of the at least one jet of the plurality of the flexible jets, wherein each projection of the plurality of projections includes an engagement surface configured to engage with a jet of the plurality of flexible jets received in an aperture when the toggle is rotated in the first direction, wherein the engagement surface has a first curved shape forcing the corresponding flexible jet into a second curved shape as the first curved shape of the corresponding engagement surface, and wherein an angle of curvature of the non-planar shaped engagement surface is different for at least two projections in the plurality of projections in such way that a projection of the plurality of projections with an engagement surface having a largest angle of curvature is disposed closest to the toggle while a projection of the plurality of projections with an engagement surface having a smallest angle of curvature is disposed further from the toggle.

2. The irrigation device of claim 1, wherein the plurality of flexible jets are constructed from a resilient material such that the at least one jet of the plurality of flexible jets is bent into the position.

3. The irrigation device of claim 1, wherein a constant decrease is provided with each angle of curvature for each engagement surface of each projection of the plurality projections between the projection of the plurality of projections with the engagement surface having the largest angle of curvature and the each projection between the plurality of projections with the engagement surface having the smallest angle of curvature.

4. The irrigation device of claim 1, wherein as the toggle is rotated in the first direction, an angle of a tab of the toggle substantially matches an angle of a jet of the plurality of flexible jets disposed closest to the toggle.

5. The irrigation device of claim 1, wherein the irrigation device is an oscillating sprinkler such that at least a portion of the body rotates about an axis that is substantially aligned with a longitudinal axis of the fluid passage.

6. The irrigation device of claim 5, wherein rotation of the toggle is about an axis that is perpendicular or substantially perpendicular to the axis of rotation for at least the portion of the body.

7. A sprinkler, comprising:
a body defining a fluid passage;
a frame coupled to the body, the frame disposed in an internal volume of the body proximate the fluid passage, wherein the frame defines a plurality of apertures;
a first toggle movably coupled to the body;
a first slider disposed within the internal volume of the body and coupled to the first toggle, the first slider defining a plurality of apertures and a plurality of projections extending away from the body; and
a first plurality of jets coupled to the frame, wherein each jet in the first plurality of jets is received by an aperture of each of the first slider and the frame, and wherein fluid from the fluid passage is selectively provided to the first plurality of jets;
wherein the first toggle is movable between a first position and a second position, wherein movement of the first toggle to the second position moves the first slider in a same direction as the first toggle, wherein the movement of the first slider in the same direction causes the first slider to move at least one jet in the first plurality of jets in the same direction such that the at least one jet in the first plurality of jets moves in the same direction as the first toggle, wherein each projection of the plurality of projections includes an engagement surface configured to engage with a jet of the first plurality of jets received in an aperture when the toggle is rotated in the first direction, wherein the engagement surface has a first curved shape forcing the corresponding jet of the first plurality of jets into a second curved shape as the first curved shape of the corresponding engagement surface, and wherein an angle of curvature of the non-planar shaped engagement surface is different for at least two projections in the plurality of projections in such way that a projection of the plurality of projections with an engagement surface having a largest angle of curvature is disposed closest to the first toggle while a projection of the plurality of projections with an engagement surface having a smallest angle of curvature is disposed further from the first toggle.

8. The sprinkler of claim 7, wherein as the first toggle is moved to the second position, an angle of a tab of the first toggle substantially matches an angle of a jet in the first plurality of jets disposed closest to the first toggle.

9. The sprinkler of claim 7, wherein the first toggle is aligned or substantially aligned with an alignment axis of the first plurality of jets.

10. The sprinkler of claim 7, wherein the first plurality of jets are constructed from a resilient material such that the at least one jet is bent in the same direction when the first slider is moved in the same direction.

11. The sprinkler of claim 7, wherein the first slider includes a body and a plurality of projections, wherein the body defines the plurality of apertures, and wherein the plurality of projections extend from the body of the first slider toward the fluid passage.

12. The sprinkler of claim 7, further comprising a first jet bend controller coupled to the frame, wherein the first jet bend controller defines a plurality of apertures, wherein each jet in the first plurality of jets is received by an aperture in the plurality of apertures of the first jet bend controller.

13. The sprinkler of claim 7, wherein the at least one jet contacts the first jet bend controller to aid movement of the at least one jet of the first plurality of jets in the same direction as the first toggle is moved from the first position to the second position.

14. The sprinkler of claim 7, further comprising:
a second toggle movably coupled to the body; and
a second slider disposed within the internal volume of the body and coupled to the second toggle, the second slider defining a plurality of apertures;
a second plurality of jets coupled to the frame, wherein each jet in the second plurality of jets is received by an aperture of each of the second slider and the frame, and wherein fluid from the fluid passage is selectively provided to the second plurality of jets;
wherein the second toggle is movable between a first position and a second position, wherein movement of the second toggle to the second position moves the second slider in a same direction as the second toggle, wherein the movement of the second slider in the same direction causes the second slider to move at least one jet in the second plurality of jets in the same direction such that the at least one jet in the second plurality of jets moves in the same direction as the second toggle.

15. The sprinkler of claim 14, wherein the first and second toggles are movable independent of each other such that the at least one jet in the first plurality of jets is movable independent of the at least one jet in the second plurality of jets.

16. A sprinkler, comprising:
a body defining a fluid passage;
a slider movably coupled to the body, wherein the slider includes a body defining a plurality of apertures and a projection extending away from the body; and
a plurality of flexible jets coupled to the body of the sprinkler, wherein the plurality of flexible jets receive fluid from the fluid passage, and wherein each jet in the plurality of flexible jets is received by an aperture in the plurality of apertures of the slider;
wherein the slider is movable within the body of the sprinkler between a first position and a second position, wherein movement of the slider to the second position causes the projection to move the at least one jet of the plurality of flexible jets in a same direction as the movement of the slider from the first position to the second position, wherein the projection includes an engagement surface configured to engage with a jet of the plurality of flexible jets received in an aperture when the slider moves between the first position and the second position, wherein the engagement surface has a first curved shape forcing the corresponding flexible jet into a second curved shape as the first curved shape of the corresponding engagement surface, and wherein an angle of curvature of the engagement surface is different for at least two projections in the plurality of projections in such way that a projection of the plurality of projections with an engagement surface having a largest angle of curvature is disposed closest to a first end of the slider while a projection of the plurality of projections with an engagement surface having a smallest angle of curvature is disposed closest to a second end of the slider.

17. The sprinkler of claim 16, further comprising a toggle movably coupled to the body of the sprinkler, wherein an angle of a tab of the toggle substantially matches an angle of a jet in the plurality of flexible jets disposed closest to the toggle.

18. The sprinkler of claim 17, wherein the toggle is aligned or substantially aligned with an alignment axis of the plurality of flexible jets.

19. The sprinkler of claim 16, wherein the at least one jet of the plurality of flexible jets is constructed from a flexible material such that the at least one jet of the plurality of flexible jets is bent in the same direction.

20. The sprinkler of claim 16, wherein the projection includes a non-planar engagement surface, wherein the non-planar engagement surface impacts the at least one jet of the plurality of flexible jets to cause the at least one jet of the plurality of flexible jets to move in the same direction.

* * * * *